United States Patent Office 3,536,507
Patented Oct. 27, 1970

3,536,507
HYDRAULIC CEMENTITIOUS MIXTURES
Alexander Klein, Danville, Calif.; Marie H. Klein, executrix of the estate of said Alexander Klein, deceased, assignor of four-tenths to Raymond E. Davis and two-tenths to Milos Polivka, both of Berkeley, Calif.
No Drawing. Continuation-in-part of application Ser. No. 617,867, Feb. 23, 1967. This application Feb. 8, 1968, Ser. No. 703,887
Int. Cl. C04b 7/02, 13/24, 13/26
U.S. Cl. 106—92      11 Claims

ABSTRACT OF THE DISCLOSURE

The properties, such as strength, of hydraulic cementitious mixtures are improved by including therein a small amount of an admixture which is derived from the fermentation liquor resulting from the aerobic fermentation of liquid carbohydrates, e.g., molasses from beet or cane sugar, corn, wheat or wood pulp, in the presence of an assimilable nitrogen compound such as ammonia with a microorganism or extract therefrom that produces glutamic acid or its precursors; a derivative may be the whole fermentation liquor or the end liquor which remains after the separation of glutamic acid from the fermentation liquor, as by acidification.

---

This is a continuation-in-part of my application Ser. No. 617,867 filed Feb. 23, 1967, now abandoned.

This invention relates to cement, mortar, grout, concrete and the like, which contains an admixture or addition introduced at any stage in the preparation thereof.

A hydraulic cementitious mixture may, for the present purpose, be defined as a mixture containing essentially a portland cement as the cementing ingredient and an admixture for modifying the properties of the mixture or of the ultimate hardened mass, hydraulic cement being cement that can harden under water. Such mixtures may or may not, in different stages, contain water and aggregate. The mixtures may contain volcanic ash, fly ash, kieselguhr or diatomaceous earth, pozzolan, blast furnace slag, ingredients giving the mixture expansive properties, and/or mineral or non-mineral aggregate or mixtures thereof.

The term "admixture" denotes a substance, other than aggregate, water or the cement used as the binding material, that is used as an ingredient to make the hydrated cementitious mixture more suitable for the work in hand. The term includes an "addition," which denotes such a substance when added to the cement at the plant where the cement is manufactured for similarly modifying the properties of the hydrated mixture, regardless of whether it also alters the grinding characteristics of the cement clinker.

In other words, the invention pertains to dry, unhydrated cement as well as to mixtures thereof with water and aggregate, e.g., to concrete, grout and mortar.

Increased plasticity and controlled setting rate of the freshly mixed concrete grout or mortar, and high early and high ultimate strength of the hardened mass, are of major importance. For brevity, freshly mixed concrete, grout and mortar will be collectively called wet cementitious mixtures. Increased plasticity improves workability and fluidity at a fixed water content, and inexpensive admixtures which increase plasticity without either incurring the cost of using an unduly high proportion of cement or making the sacrifice to strength by using an excessive amount of water to maintain the required plasticity have long been sought. The rate of setting is often important, as in the case of tunnel linings, wherein it is desired that the concrete attain its final set in a relatively short time. The importance of early and ultimate strengths is self-evident. For methods used in determining the consistency and workability of wet cementitious mixtures, see U.S. Pat. No. 2,588,248.

Drawbacks of earlier admixtures were set forth in my prior U.S. Pat. No. 2,793,129. An additional drawback was the need to control carefully the quantity of the admixture introduced, which often was critical to attaining the desired improvement. Thus, with many known admixtures, no commensurate improvement was attained with increasing concentrations of the admixture, and in certain cases the addition of an excessive amount of the admixture led to a decrease in the strength properties or some other detrimental effect. Further, undue retardation of the setting rate, regardless of whether the design or specification strengths are obtained, is of great concern and of considerable adverse consequence in practical construction practice.

In accordance with the present invention, plasticity of wet hydraulic cementitious mixtures and the strengths of the hardened mixtures resulting from such mixtures are improved by including therein a small quantity of an admixture which is effective with a wide variety of cements of different origins. Moreover, the admixture is effective to raise the early strength characteristics of the hardened mass although excessively large amounts of the admixture are included, i.e., such amounts as are generally considered to be excessive and in some instances to lead to adverse effects. Finally, the setting rate of the freshly prepared wet cementitious mixture is not necessarily retarded by the admixture of the invention, and this admixture may in some instances actually accelerate the setting rate.

In summary, according to the invention one or more characteristics of hydraulic cementitious mixture are improved by including therein an admixture which includes between 0.02 and 1.0 percent by weight, reckoned on a dry basis on the cement content of said mixture, of the part of a fermentation liquor, produced by fermenting an aqueous carbohydrate medium aerobically in the presence of an assimilable nitrogen compound under conditions to produce glutamic acid or its precursors, that remains after the separation of glutamic acid therefrom. The glutamic acid may, of course, be included in the admixture; and impurities separated in the course of the recovery of glutamic acid and may be absent therefrom.

The fermentation process is known per se and is subject to variations as to the nutrient, the fermentation agent, the source of assimilable nitrogen, the growth factors included, and other conditions, especially pH and temperature. Some of these variations are described in the U.S. patent to Lee et al. No. 3,087,863, dated Apr. 30, 1963, from which it is evident that the fermentation agent which produces L-glutamic acid may be either the living microorganism or an extract of the organism which contains the active catalytic material, both herein generically called a biological catalyst system produced by such a microorganism; that many microorganisms promote such a fermentation but that, from the experiments performed by the patentees, certain species of the genus Corynebacterium, specifically *Corynebacterium lilium* and *Cornyebacterium callunae*, appeared to be preferred. The patent further named several sources of assimilable nitrogen, including the compounds ammonia, urea, and ammonium compounds, such as the phosphate, chloride and sulfate. However, the present invention is not limited to fermentation liquors obtained in the production of glutamic acid by the preferred process of the Lee et al. patent, and other fermentation organisms may be used, e.g., as disclosed in the Lee et al. patent, or in the patents to Yamada, U.S.

Nos. 2,978,383 and 2,978,384, both dated Apr. 4, 1961.

Although various carbohydrate sources, as mentioned in these three cited patents, may be used for the fermentation liquid, the most suitable are molasses, such as molasses from sugar beet, from sugar cane (also known as black strap molasses), corn, wheat, wheat gluten and wood pulp. It is preferred to use a member of the class consisting of cane sugar molasses, beet sugar molasses, and their mixture.

The fermentation liquor contains no significant amount of alcohol. The presence of a nitrogen source is insured by adding an assimilable compound from time to time, as by sparging ammonia into the fermenting liquid continuously or intermittently, particularly when the starting molasses are deficient in such compounds.

The whole fermentation liquor can be used as the admixture or as a constituent thereof preferably after changing its pH to a low value below 4, e.g., to crystallize glutamic acid. For example, pyrrolidone carboxylic acid is the anhydride and precursor of glutamic acid and can be hydrolyzed in this manner, using a pH of about 3.2. However, excellent results are obtained when the admixture contains only the part of the fermentation liquor that remains after the separation of glutamic acid therefrom. This separation can be carried out by conventional means; in one acceptable process, the fermentation liquor (optionally after treatment to remove impurities such as suspended solids slimes or reduce their concentration, and/ or concentration by evaporation of some liquid) is treated with the amount of a strong acid, such as sulfuric or hydrochloric acid, to produce a pH of about 3.2, to crystallize glutamic acid. Such a fermentation end liquor from which glutamic acid was removed is especially desirable because it is a by-product and is available economically. Various techniques for the separation of impurities and the recovery of glutamic acid from the fermentation liquor are disclosed in the aforesaid U.S. patent to Lee et al. No. 3,087,863, especially in column 6 thereof, and the remaining part of the fermentation liquor is called fermentation end liquor (FEL) and is included in the generic term "fermentation liquor."

The fermentation liquor, whether whole, or after separation of glutamic acid and impurities, and whether in its natural state or after its pH was changed and other constituents are hydrolyzed, optionally after dilution with water or concentration by removing water, can be incorporated into the cementitious mixture either alone in its existing pH such as 3 to 3.4, or fully or partially neutralized with a base, such as a hydroxide of sodium, potassium or calcium, or an organic base, such as an amine, e.g., triethanolamine. The pH can alo be modified by admixing with the natural or the acidified fermentation liquor one or more materials which are produced in the manufacture of sugar. Among the latter are concentrated Steffen filtrate and hydrolyzed molasses (i.e., molasses as previously indicated which were treated with an acid or an alkali to hydrolyze sugars). The pH of such a naturalization product is usually between 4.0 and 10.0. The fermentation liquid, whether or not acidified, may also be combined in any desired proportions, such as 1:3 to 3:1, with the end liquor resulting from the separation of glutamic acid from concentrated Steffen filtrate, as described in the aforesaid U.S. Pat. No. 2,793,129, or with the hydrolyzed product resulting from the hydrolysis of concentrated Steffen filtrate, as described in U.S. Pat. No. 2,900,265.

It is advantageous to employ that amount of high-pH materials which will produce a combined product admixture having a pH within the range of about 4.5 to 8.0; the slightly acid product, having a pH below 6.5, e.g., 5.0, is preferred and was found often to lead to optimum results. Further, the storage and shipment of admixtures having a pH between about 5.0 and 8.0 is more economical than with other pH values, in that the corrosion problem is minimized.

Because as is well known, sugars can act as retarders, it is possible to effect a refining control of the setting rate of the cementitious mixture in which the admixture is incorporated by controlling the ratio of hydrolyzed molasses to fermentation liquors. Although such hydrolyzed molasses are largely free from sugars, hydrolyzation is normally insufficient to destroy entirely the retarding effect. Similarly, the end liquor resulting from the separation of glutamic acid from concentrated Steffen filtrate results in a slower setting rate than does fermentation liquor, and a refining control of the setting rate can also be achieved by controlling their ratios.

The admixture of the invention may be added to the hydraulic cementitious mixture in any desired manner, either alone as the only admixture, or in conjunction with other admixtures which may be incorporated separately or together with the admixture of the invention after being mixed therewith. As an example, it is possible to use as an additional admixture an air-entraining agent, such as a foaming resin, a sulfonated hydrocarbon, alkylarylsulfonates, hydrolyzed proteins, or gas-generating agents such as aluminum powder, appropriate chemicals or minerals, such as calcium sulfate or the like, or various organic retarders; these additional admixtures, being known per se, are not further described herein. When such additional admixture is unstable or ineffective at an extreme pH it is advisable to adjust the pH in a manner described above, both in the case in which the additional admixture is incorporated separately and when, if found compatible, it is first combined with the fermentation liquor. Further, if the admixture is incorporated with the cement at the manufacturing plant, it is possible to use it together with other known additions.

The admixture of the invention can be incorporated into the cementitious mixture as desired, e.g., during the grinding of the cement clinker at the cement plant, separately during mixing with aggregate, or together with one of the main ingredients of the wet cementitious mixture, care being taken to ensure proper mixing. The admixture can also be mixed with a small part of the cement to produce a pre-packaged, concentrated mixture suitable for subsequent mixing with the other cement used in preparing the wet cementitious mixture. The admixture can also be added to the sand which, when subsequently mixed with cement and water, produces grout or mortar, or produces concrete when coarser aggregate is present. In most cases, however, it is convenient to add the admixture with the mixing water, e.g., first forming a solution of the admixture in a minor portion of the water and thereafter combining the solution with the remainder of the water, or to add the admixture directly to the completed plastic mix. While the admixtures of the invention are generally fluid, they may be incorporated in combination with an organic or mineral filler vehicle, or be reduced to solid form by spray drying.

Although the admixture of this invention possesses plasticizing properties, it is not merely a plasticizer. The present admixture should be distinguished from prior admixtures that contain or consist largely of sugar or sugar-containing substances such as sucrose molasses, as well as those which are produced in the fermentation of fermentable carbohydrate materials in the production of alcohols or certain alcoholic beverages, such as crude fermentation residues or evaporated molasses residues. (See U.S. Pat. No. 2,311,288.) Such prior admixtures were added only as plasticizers; however those that contain sugar have the inherent property of retarding the setting of wet hydraulic cementitious mixtures and therefore reduce the early strength, such as those at 1 to 3 days. In some instances such admixtures are used together with accelerators to compensate for undue retardation, to conform to present construction practice, in which economy dictates relatively higher early strengths. Moreover, the nature of the fermentation process employed in the production of alcohols for alcoholic beverages and the composition of the fermentation liquor differ from those used in the fermentation of molasses according to the present invention in that the instant fermentation liquor is produced under aerobic conditions.

The fermentation of molasses or other carbohydrates to produce the fermentation liquor used in this invention can be carried out in a variety of ways which produce similar end products, and I do not wish to be restricted to the following specific technique, which is described as illustrative, nor to molasses from a specific source. The molasses usually used as the starting material is in some forms produced by sugar mills from sugar beet or sugar cane by recovering sugar to the extent that further crystallization of sugar from it is impractical. The molasses produced from California beets may have the composition reported on page 439 of "Beet Sugar Technology" by R. A. McGinnis, 1951. This contains approximately 51 percent sucrose, 2 percent raffinose and invert sugar, 3.5 percent glutamic acid, 5.5 percent protein, 10 percent other organic materials, and 11.5 percent of inorganic materials. A typical analysis of cane sugar molasses is given on page 514 of "Principles of Sugar Technology," vol. 3, by P. Honig. This contains approximately 32 percent saccharose, 14 percent glucose, 16 percent fructose, 10 percent other organic materials, and 8 percent inorganic materials.

The molasses is charged into a large tank together with water. Vitamins and salts, called growth factors and related to the subsequent effectiveness of fermentation may be added. The diluted molasses is then seeded with an organism or its extract which produces glutamic acid or its precursor, e.g., alpha pyrrolidone carboxylic acid. Several types of such organisms have been developed and are known in the industry for the production of glutamic acid, as was noted above. During the fermentation ammonia or other source of assimilable nitrogen is introduced into the fermenting liquid as required and air is blown in as required to maintain aerobic conditions. After fermentation, the mixture is treated by physical coagulation and by thermal treatments to remove the bacterial cells, if present; this may involve centrifuging or filtration. The filtrate is acidified with an inorganic acid, such as sulfuric or hydrochloric acid, to a pH of about 3.2, which is the isoelectric point of glutamic acid and results in the hydrolysis of alpha pyrrolidone carboxylic acid to form glutamic acid. The acidified solution is then cooled to crystallize the glutamic acid, which is thereupon separated by centrifuging. The filtrate is fermentation end liquor which is one form of the admixture of the present invention, and has a pH of about 3.2. Hence, the fermentation end liquor is the principal residue of fermentation liquor which remains after purification and recovery therefrom of glutamic acid, including impurities originally present in the molasses (or other carbohydrate), those formed during the fermentation process, and those formed during the purification. A typical analysis of this liquor, having a pH of 3.0 and containing 46.6% dry substances (as determined by refractive index), is:

Total protein*—19.4%
$NH_3$*—9.0%
$Cl^-$—11.0%
K—2.2%
Na—9.4%
Ash—15.1%

Computed at 6.25 times nitrogen and ammoniacal nitrogen, respectively, hence sum does not equal 46.6%.

It is to be noted that the molasses or other raw material need not contain glutamic acid for effective use in the process, but glutamic acid need not be absent in such material. Also, wide variations in the compositions of the molasses with respect to the amounts and nature of the sugars do not necessarily detract from the usefulness of the molasses as starting material.

When molasses are hydrolyzed to produce products which are to be combined with the admixture described above, the pH can be brought to below 3.2, down to 1.0 and lower, or raised to a value above 11, up to 13 or above.

The efficacy of the admixtures is demonstrated by the following experimental data.

EXAMPLE I

A plurality of fresh concrete batches were prepared from portions of the same portland cement of ASTM Type II and portions of a stock of graded mineral aggregate from 0 to ¾-inch in size and having a fineness modulus of 5.0, in the ratio of 1:6.52, cement to total aggregate by weight. The first batch was the control, the others contained the admixture indicated by capital letters in Table I, which letters denote: FEL, a fermentation end liquor according to the invention, having a solids content of 39 percent by weight and produced by submerged aerobic fermentation of beet sugar molasses with an organism of the genus Corynebacterium in the presence of ammonia, from which glutamic acid was separated; A and B, different commercial admixtures purchased in the open market, both classified as modified hydroxylated carboxylic type, used to reduce the water required and thereby promote early strength. The solids content of admixtures A and B is not known but is believed to be higher than that of FEL.

The quantities of admixture shown in the table were reckoned as fluid ounces per sack (94 lbs.) of cement, and were selected to achieve a nominal slump of 3½ inches (about the average consistency used in construction practice) with approximately the same water to cement ratio; the same slump was attained in the control batch by the use of more water. The concretes were molded in 3- by 6-inch cylinders and cured at standard conditions in a moist atmosphere. Strengths were determined at ages 1, 3, 7 and 28 days; each value tabulated is the average of three specimens of concrete.

TABLE I

| Admixture | | Water to cement ratio by weight | Compressive strengths | | | | | | | |
|---|---|---|---|---|---|---|---|---|---|---|
| Type | Dosage, fl. oz. per sack of cement | | 1 day | | 3 days | | 7 days | | 28 days | |
| | | | P.s.i. | Percent | P.s.i. | Percent | P.s.i. | Percent | P.s.i. | Percent |
| None | | 0.59 | 470 | 100 | 1,080 | 100 | 1,670 | 100 | 3,060 | 100 |
| FEL | ¹ 6.00 | 0.54 | 620 | 132 | 1,550 | 143 | 2,290 | 137 | 3,640 | 119 |
| A | 2.75 | 0.54 | 680 | 145 | 1,210 | 112 | 2,050 | 123 | 3,410 | 111 |
| B | 2.50 | 0.55 | 640 | 136 | 1,310 | 121 | 1,910 | 114 | 3,250 | 106 |

¹ 2.34 oz. on basis of 100 percent solids.

It will be noted that compressive strengths are reported both in pounds per square inch and as the percentages of the strengths of the control batch. The data show that FEL was superior at all ages except at 1 day, but as is indicated hereafter, even the 1-day strength was easily raised with a slight increase in the dosage of FEL. Admixtures A and B were used at dosages about those considered optimum in construction practice. The effect of large increases in dosage of admixtures A and B may cause a drastic reduction of early-age strengths.

EXAMPLE II

To demonstrate the efficacy of the admixture when used in greatly varying dosages, one control and four test batches containing various amounts of FEL were prepared, molded, cured and tested as described for Example I, but using another cement, also ASTM Type II, and adjusting the water to a nominal slump of 3 inches. The results are shown in Table II.

TABLE II

| Type | Admixture Dosage per sack of cement | | Water to cement ratio by weight | Compressive strengths | | | | | | | |
|---|---|---|---|---|---|---|---|---|---|---|---|
| | | | | 1 day | | 3 days | | 7 days | | 28 days | |
| | Fl. oz. | Oz. of solids | | P.s.i. | Percent | P.s.i. | Percent | P.s.i. | Percent | P.s.i. | Percent |
| None | | | 0.62 | 530 | 100 | 1,150 | 100 | 1,840 | 100 | 3,290 | 100 |
| FEL | 2 | 0.78 | 0.60 | 580 | 109 | 1,350 | 119 | 1,890 | 103 | 3,270 | 99 |
| FEL | 4 | 1.56 | 0.57 | 680 | 128 | 1,430 | 124 | 2,120 | 115 | 3,560 | 108 |
| FEL[1] | 6 | 2.34 | | | 132 | | 143 | | 137 | | 119 |
| FEL | 8 | 3.12 | 0.55 | 720 | 136 | 1,650 | 143 | 2,410 | 131 | 3,680 | 112 |
| FEL | 16 | 6.24 | 0.54 | 550 | 104 | 1,650 | 143 | 2,540 | 138 | 3,700 | 113 |

[1] Data from Table I.

The data show that the admixture was progressively effective at increasing dosages, and no significant deterioration in strength (save at 1 day) was noted even when 16 fluid ounces per sack of cement (94 pounds) were used. Using the data for FEL from Table I for a different control concrete, it is demonstrated that while the optimum dosage is 6 to 8 fluid ounces of liquid, or about 2.3 to 3.1 ounces on the basis of solids, there is no significant effect on strengths after one day, even though the dosage was doubled.

EXAMPLE III

To demonstrate the effect of the admixture on the time of setting, five batches of fresh concrete were prepared using 5.5 sacks of ASTM Type I cement per cubic yard of concrete, the aggregate having a maximum size of 1 inch and the water being adjusted to a nominal slump of 3 inches. The first batch was the control, the next two batches contained varying amounts of FEL, according to the invention. The next two batches contained, respectively, the admixtures A and B described in Example I. To demonstrate the effect of the end liquor from concentrated Steffen filtrate (CSF) after the separation of glutamic acid therefrom by acidification (EL), three additional batches were prepared, one a control and the two others containing the amount of EL and of a mixture of equal parts of EL and CSF, respectively, indicated in Table III. The initial and final times of setting were determined using a penetration resistance apparatus as described in ASTM Method of Test C403.

increased acceleration of both the initial and the final time of setting. An increase in the dosage of admixture A or B is said to cause a further retardation of setting.

I claim as my invention:

1. A cementitious mixture consisting essentially of portland cement as the cementing ingredient and an admixture which includes between about 0.02 and 1.0 percent by weight, reckoned on a dry basis on the cement content of said mixture, of the part of a fermentation liquor that remains after glutamic acid is separated therefrom, said fermentation liquor being produced by fermenting an aqueous carbohydrate aerobically in the presence of an assimilable nitrogen compound while producing glutamic acid or its precursor, said admixture serving to increase the plasticity and compressive strength and modify the set rate of said cementitious mixture.

2. A cementitious mixture as defined in claim 1 wherein said admixture contains the fermentation end liquor which remains after the separation of glutamic acid from said fermentation liquor and excludes said separated glutamic acid.

3. A cementitious mixture as defined in claim 2 wherein said fermentation liquor is produced by fermenting a member of the class consisting of sugar molasses and beet sugar molasses with a microorganism of the genus Corynebacterium.

4. A cementitious mixture as defined in claim 3 wherein the glutamic acid is sepaarted by steps including the acidification of the fermentation liquor to a low pH at which glutamic acid is crystallized.

5. A cementitious mixture as defined in claim 1 wherein said admixture contains, in addition, at least one member of the class consisting of the end liquor remaining after the separation of glutamic acid from concentrated Steffen filtrate and hydrolyzed molasses.

6. A cementitious mixture as defined in claim 1 wherein said admixture includes the neutralization product having a pH between 4.0 and 10 which results from the

TABLE III

| Type | Admixture Dosage per sack of cement | | Water to cement ratio by weight | Time of setting | | | |
|---|---|---|---|---|---|---|---|
| | | | | Initial | | Final | |
| | Fl. oz. | Oz. of solids | | Time | Percent | Time | Percent |
| None | | | 0.59 | 5'50" | 100 | 8'50" | 100 |
| FEL | 4 | 1.56 | 0.56 | 5'40" | 97 | 8'20" | 94 |
| FEL | 6 | 2.34 | 0.54 | 5'25" | 92 | 7'35" | 86 |
| A | 2.75 | 2.75 | 0.55 | 6'45" | 117 | 9'45" | 107 |
| B | 2.50 | 2.50 | 0.55 | 7'00" | 120 | 10'10" | 114 |
| None | | | 0.54 | 4'45" | 100 | 7'30" | 100 |
| EL | 5 | 1.95 | 0.50 | 7'00" | 147 | 9'45" | 130 |
| EL plus CSF | 5 | 2.90 | 0.50 | 7'15" | 152 | 9'30" | 127 |

The data show that FEL accelerated the initial and final setting, in contrast to other admixtures tested, such as A, B, and the two containing EL, all of which retarded the setting. Increasing the dosage of the admixture FEL from 4 to 6 fluid ounces per sack of cement resulted in an neutralization of fermentation end liquor with at least one member of the class consisting of molasses hydrolyzed with an alkali and concentrated Steffen filtrate, said fermentation end liquor being produced by separating glutamic acid from said fermentation liquor by steps including the acidification of the fermentation liquor to a low pH at which glutamic acid is crystallized.

7. A cementitious mixture as defined in claim 1 wherein said carbohydrate is molasses.

8. A cementitious mixture as defined in claim 7 wherein said molasses is a member of the class consisting of cane sugar molasses and beet sugar molasses.

9. A cementitious mixture as defined in claim 1 wherein said fermentation liquor is produced by fermenting molasses in the presence of an active biological system produced by a microorganism of the genus Corynebacterium.

10. A cementitious mixture as defined in claim 9 wherein said admixture includes the product formed by acidifying said fermentation liquor to a low pH at which glutamic acid is formed by hydrolysis of a precursor thereof.

11. A cementitious mixture as defined in claim 10 wherein said admixture includes the fermentation end liquor which remains after the separation of glutamic acid from the fermentation liquor and excludes said separated glutamic acid.

References Cited
UNITED STATES PATENTS

| | | |
|---|---|---|
| 3,087,863 | 4/1963 | Lee et al. |
| 2,978,384 | 4/1961 | Yamada. |
| 2,978,383 | 4/1961 | Yamada. |
| 2,900,265 | 8/1959 | Klein. |
| 2,823,135 | 2/1958 | Toulmin. |
| 2,793,129 | 5/1957 | Klein. |
| 2,588,248 | 3/1952 | Klein. |
| 2,311,290 | 2/1943 | Booth. |
| 2,311,288 | 2/1943 | Booth. |

TOBIAS E. LEVOW, Primary Examiner

W. T. SCOTT, Assistant Examiner

U.S. Cl. X.R.

106—90, 104, 314, 315; 195—47